Figure 1:
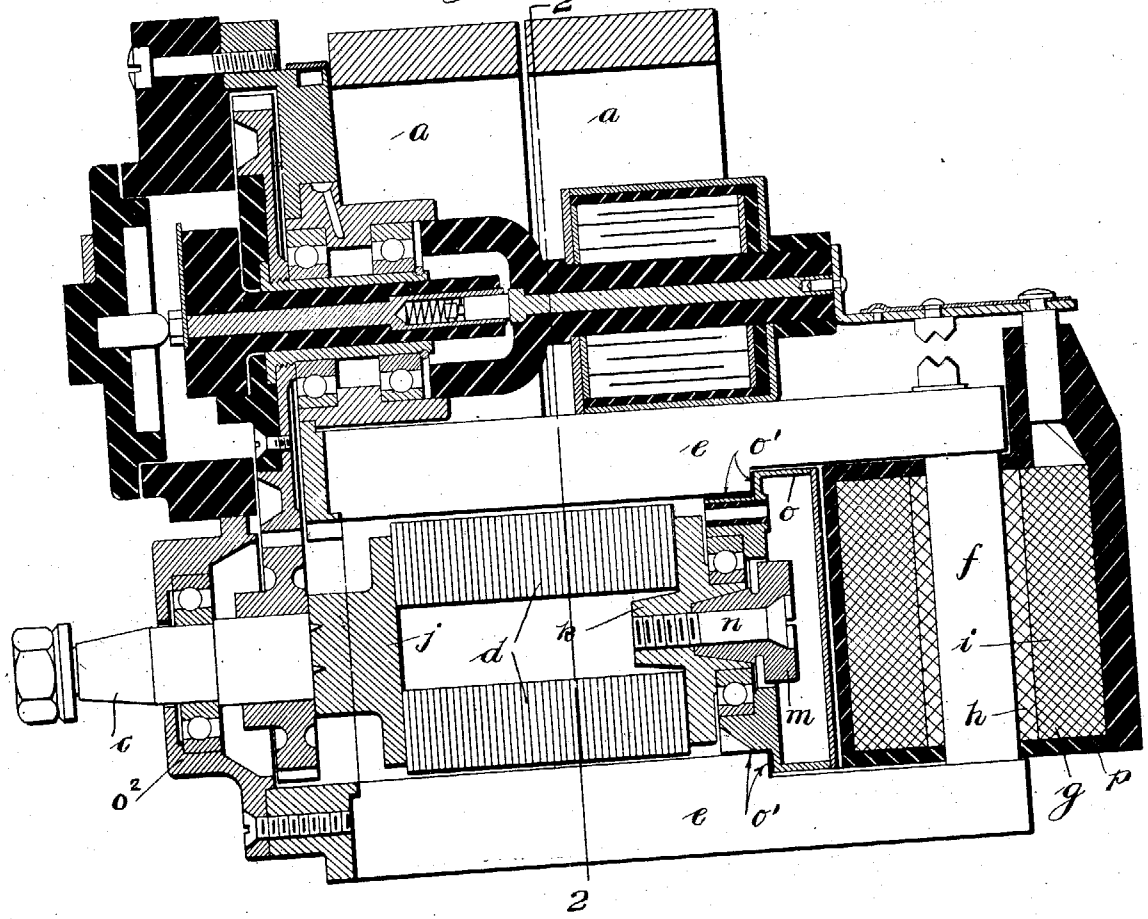

J. B. FRAWLEY.

MAGNETO ELECTRIC MACHINE.

APPLICATION FILED MAR. 23, 1916.

Reissued Aug. 15, 1916.

14,181.

2 SHEETS—SHEET 1.

Inventor:
James B. Frawley,
by Harry N. Bourne
his Attorney

J. B. FRAWLEY.

MAGNETO ELECTRIC MACHINE.

APPLICATION FILED MAR. 23, 1916.

Reissued Aug. 15, 1916.

14,181.

2-SHEETS—SHEET 2.

Inventor:
James B. Frawley
by Harry W. Brown
his Attorney.

UNITED STATES PATENT OFFICE.

JAMES B. FRAWLEY, OF PITTSFIELD, MASSACHUSETTS, ASSIGNOR, BY MESNE ASSIGNMENTS, TO BERKSHIRE MAGNETO COMPANY, OF PITTSFIELD, MASSACHUSETTS.

MAGNETO-ELECTRIC MACHINE.

Specification of Reissued Letters Patent. Reissued Aug. 15, 1916.

14,181.

Original No. 1,160,995, dated November 16, 1915, Serial No. 674,520. Application for reissue filed March 23, 1916. Serial No. 86,321.

*To all whom it may concern:*

Be it known that I, JAMES B. FRAWLEY, a citizen of the United States, residing in the city of Pittsfield, county of Berkshire, and State of Massachusetts, have invented certain new and useful Improvements in Magneto-Electric Machines, of which the following is a specification.

This invention relates to improvements in magneto electric machines for ignition purposes of the type shown in the United States Letters Patent issued to Theodor M. Mueller on December 21, 1909, numbered 943,697, and on May 24, 1910 numbered 958,754, in which a movable sleeve member is interposed between the pole-pieces of the permanent magnets and the soft iron laminated core pieces which stand in a plane at right angles to the plane of the soft iron pole-pieces. The present invention has for one of its objects to dispense with this movable sleeve member, whereby the efficiency of the machine is materially increased.

A further object of the invention is to lessen the demagnetizing effect of eddy currents which are produced in the non-magnetic members that support the laminated core pieces.

In magnetos of the type shown in the above referred to patents, particularly patent numbered 943,697 December 21, 1909, (in which the sleeve member is adjustable) the occurrence of the spark may be varied; or, in other words the spark may be advanced or retarded with relation to the angular position of the shaft.

It is sometimes desirable to use ignition machines in which the occurrence of the spark, with relation to the angular position of the inductor, is or may be always fixed. In order to accomplish this object, it is found that the sleeve member may be entirely omitted without destroying the efficiency of the machine when used for ignition purposes. In practice, however, it is discovered that the electrical efficiency is materially increased over the structures shown in the above mentioned patents.

The removal of this sleeve member therefore causes the machine to produce a spark at practically the same angular position of the rotatable inductor element, and at the same time lessens the cost of construction and increase its efficiency.

In order to accomplish the objects above set forth, I have discovered that by electrically insulating the interrupter box or casing from the core-pieces, the pole-pieces, and the holders of the pole-pieces, that the flow of eddy currents which are generated in the interrupter box or casing is prevented, and thereby greatly increasing the out-put or efficiency of the machines as will be fully set forth.

Figure 2:
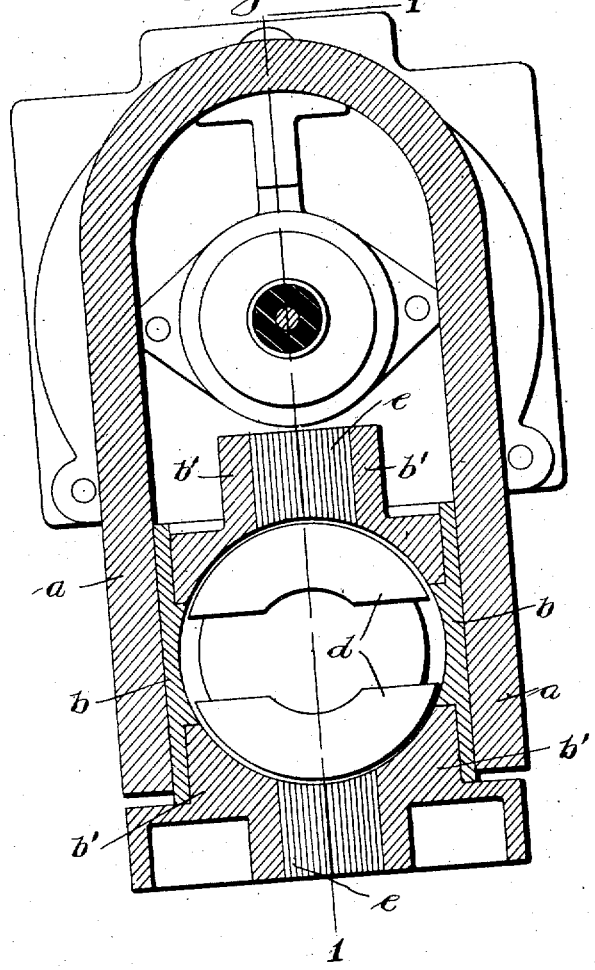

In the drawings forming part of this application: Figure 1 is a longitudinal, sectional view of the magneto on the line 1—1, of Fig. 2, taken through the axis of the inductor shaft, clearly showing the machine with the movable sleeve member omitted, and the electrical insulation element located between the interrupter casing or bearing box and the core-members; Fig. 2 is a transverse sectional view on the line 2—2 of Fig. 1 showing the arrangement of the poles of the permanent magnets and those of the soft iron laminated core-pieces, also the rotating inductor member carried by the shaft.

Referring to the drawings, in detail, *a* designates the permanent field magnets having the soft iron pole or face pieces *b*, and $b^1$ pieces of brass to support the laminated core pieces.

*c* designates a shaft to which are secured the soft iron arc-shaped inductor members *d*. The indicator members *d* are rotatably supported by means of the two casings and $c^2$ which carry ball bearings, that are located respectively, at the inner and outer ends of the rotatable supporting means of the inductors of the machine, as shown. The laminated core-pieces are arranged at 90° from the pole pieces *b*. The former pieces extend parallel with the shaft *c*, as shown in Fig. 1 and as in the above referred to patents, their outer ends are connected by the core *f* of the induction coil which is designated as a whole by the letter *g*,—the primary and secondary windings of which are shown at *h* and *i*.

The electrical connections to the windings of the inductor coils are not shown as they do not form any part of the present invention.

The arc-shaped inductor members *d* are rigidly clamped between the disk pieces *j* and *k*, necessarily composed of some non-magnetic material, as brass or bronze in order to prevent a closed magnetic circuit through the cores *e* and inductor members

*d*. If the disk *k* is composed of magnetic material it is clear that the path of the lines of force would be closed through this disk and not through the core *f*, or, in other words the magnetic lines of force would form a closed short magnetic circuit through the inductor members *d* and the disk *k* if this disk was composed of magnetic material. The efficiency of the machine would, therefore, be greatly reduced and practically inoperative since the magnetic flux would then be short circuited through the disk *k*, instead of causing the magnetic lines of force to flow through the core *f*, as they would be forced to do, if the disk *k* is composed of some non-magnetic material.

*m* indicates a cam element through which passes a screw *n* for attaching the same to the rotating shaft.

Suitable timing devices may be employed in connection with the usual make and break mechanism which are operated by the cam *m* whereby the occurrence of the spark in the secondary may be advanced or retarded.

The induction coil *g* is axially spaced from the soft iron arc-shaped inductor members *d* by means of the interrupter casing or bearing box. This casing or box is electrically insulated from the pole-pieces *b* and its holders *b'* by means of the insulation shown at *o'*. The object and purpose of the insulation *o'* is to prevent the flow of electric currents in the pole-pieces *b*, and its holder *b'* due to the potential generated in the casing or bearing box *o*. It is clear that when the laminated inductor members *d* are rotated, the casing or bearing box *o* will be subjected to an alternating magnetic flux from one core member *e* to the other. This alternating flux will generate a voltage in the metal casing or bearing box *o*, and, if this box is not insulated from the pole-pieces *b* and their holders *b'* an electric current will flow through these parts, with a result that a magnetic field, due to this current will be set up which will oppose the flow of the magnetic flux in the core-pieces *e*, or, in other words by the use of the insulation *o'*, a current will not be permitted to flow from the casing or bearing box *o* through the pole pieces *b*, their holders *b'*, and any external parts of the machine, for example, the field magnets, thus completing a closed electric circuit which current would set up a counter magnetic field that would oppose the flux in the core-pieces *e* and thus lessen the efficiency of the machine. On account of the magnetic flux alternating from one core *e* to the other core *e* across and around the metal casing or bearing box *o* and the adjacent metal parts of the machine as the metal base on which the machine rests, sufficient voltage would be produced to generate an electric current which, if not prevented by insulation in some portion of its circuit would set up a counter magneto motive force reducing the efficiency and capability of the machine. The eddy electric currents generated by means of this magnetic flux in the box *o* and the flux produced by the same would oppose the flux in the core *e e* with the result that the current generated in the coil *g* would be very much less. Therefore, in order to prevent the flow of these eddy currents the insulation shown at *o'* is provided. This insulation as shown is located in the most convenient part of the circuit of the eddy currents, that is between the casing or bearing box *o* and the cores *e*, *e*. The flux path for the magnetic lines of force will, therefore, be largely confined to the parts *d*, *e* and *f*, the flux flowing in alternate directions, as the arc-shaped members *d* are rotated in succession past the north and south poles of the magnets *a*: Also the pieces *b'* are maintained in a cooler condition as eddy currents can not circulate through the pieces of insulation *o'*. This construction produces an increased efficiency over the construction shown in the above mentioned patents wherein the adjustable sleeve is used, as it cuts down the air gaps, and also reduces the losses caused by eddy currents in the masses of iron composing the adjustable sleeve. It is clear that any mechanical structure which is composed of conductive material and that is located in a position which is approximate to the casing or bearing box *o* as the cam *m*, screw *n* and disk *k* must be thoroughly insulated from the cores *e*, as described, in order to accomplish the results sought or the idea in mind, or, in other words to prevent the flow of an electric current through the casing or box *o* and the adjacent metal parts which are composed of conductive material.

The means for distributing and delivering the secondary current to the spark-plugs by the magneto forms no part of my invention and the description of the same is not, therefore included.

In the operation of the machine, when the shaft *c* is rotated, the soft iron members *d* pass in succession past the members *b* and *e* and serve as a means to alternately convey the magnetic flux from the poles of the permanent magnets *a* to the core-pieces *e* in the manner fully described in the above referred to patents, with the result that a spark current is induced in the secondary winding *i* when the primary is opened by the timer in the usual manner.

It will be noticed that the soft iron arc-shaped members *d* serve to directly convey the magnetic flux from the permanent magnets *a* to the core-pieces *e* without the intervention of the adjustable sleeve member in the above referred to patents, with the result that the spark is always produced at the same time in the secondary or spark circuit corresponding to the same angular position of the shaft each time a spark is produced; or, in other words, the spark is a fixed one and not an adjustable one, as in the above referred to patents; but of course, a suitable timing device may be employed to advance or retard the spark, if desirable. The projecting outer ends of the pole-pieces *e* serve to receive the induction coil *g* which is made removable for repairs of break downs. This construction limits and confines the magnetic flux field to this portion of the machine that is spaced away from the permanent magnets and also serves to increase the efficiency of the machine.

What I claim is:

1. A magneto electric machine of the inductor alternator type, in combination, a field magnet, a pair of core-pieces, non-magnetic means to support the same, inductor members to convey the magnetic flux from the field magnets to the core-pieces, said core-pieces having projecting ends, an induction coil located between said ends, a casing located between the core-pieces, means to electrically insulate the casing from the core-pieces, whereby the eddy currents that may be generated in the casing will be prevented from flowing in a closed electric circuit interlinking the core pieces and opposing the flow of flux from the permanent field through the core-pieces, as described.

2. A magneto electric machine of the type described, in combination, permanent magnets to produce a constant field, core pieces to receive the flux from the permanent magnets, an induction coil arranged between the ends of the core-pieces, inductor means to directly and alternately convey the flux from the constant field to the core-pieces, a casing located between the core-pieces, means to prevent the flow of eddy currents in a circuit comprising the said casing, whereby the demagnetizing effects due to such eddy currents in the casing are prevented.

3. The combination, in a magneto electric machine, of a rotatable inductor member, permanent magnets, pole pieces secured thereto, core-pieces angularly spaced from the pole-pieces, holders therefor, an induction coil having its core located between the ends of the core pieces, an interrupter or circuit breaker casing located between the core-pieces, means for insulating said casing, thereby preventing the flow through said casing of eddy currents induced therein whereby the magnetic flux in the core-pieces is not opposed thereby.

4. A magneto electric machine of the inductor alternator type, in combination, a field magnet, core-pieces, non-magnetic means to support the same, inductor members to convey the magnetic flux from the field magnets to the core pieces, said core-pieces having projecting ends, an induction coil located between said ends, a casing located between the core-pieces, means to electrically insulate the casing and said supporting means from the core-pieces, whereby the electric currents that may be generated in the casing and adjacent metal parts of the machine will be prevented from flowing in a closed electric circuit interlinking the core pieces and opposing the flow of flux from the permanent field through the core-pieces, as described.

5. A magneto electric machine of the type described, in combination, magnets to produce a constant field, core-pieces to receive the flux from the magnets, an induction coil arranged between the core pieces, inductor means to directly and alternately convey the flux from the magnets to the core-pieces, a casing located between the core-pieces, means to prevent the flow of eddy currents in a circuit comprising said casing, whereby the demagnetizing effect, due to such currents in the casing is prevented.

6. The combination, in a magneto-electric machine, of a rotatable inductor, permanent magnets, pole-pieces, secured thereto, holders therefor, an induction coil having its core located between the core pieces, a casing located between the core-pieces, means for electrically insulating said casing or box, whereby the electric currents that are generated in said casing may be prevented from forming a closed circuit including said casing, as described, and the magnetic flux in the core-pieces is not opposed thereby.

7. A magneto electric machine of the type described comprising, in combination, magnets for producing a magnetic field, cores for receiving the flux from said magnets, an induction coil located to receive the flux from the cores, inductors to directly and alternately convey the flux from the magnets to the cores, casings to support the inductors, the innermost one of said casings being located between the cores, means for insulating the innermost one of said casings from the cores for preventing the interlinking of electric currents between the innermost casing, the cores and the adjacent metal parts of the machine, whereby the efficiency of the machine is increased, as described.

JAMES B. FRAWLEY.

Copies of this patent may be obtained for five cents each, by addressing the "Commissioner of Patents. Washington, D. C."